United States Patent
Hart

(10) Patent No.: US 8,989,955 B1
(45) Date of Patent: Mar. 24, 2015

(54) VEHICLE PROFILE CONTROL AND MONITORING

(71) Applicant: Paul Hart, Dyersburg, TN (US)

(72) Inventor: Paul Hart, Dyersburg, TN (US)

(*) Notice: Subject to any disclaimer, the term of this patent is extended or adjusted under 35 U.S.C. 154(b) by 0 days.

(21) Appl. No.: 13/913,660

(22) Filed: Jun. 10, 2013

Related U.S. Application Data

(63) Continuation of application No. 12/822,539, filed on Jun. 24, 2010, now Pat. No. 8,463,488.

(51) Int. Cl.
| | |
|---|---|
| G06F 19/00 | (2011.01) |
| G07C 5/02 | (2006.01) |
| B60R 25/00 | (2013.01) |
| G06F 17/00 | (2006.01) |
| B60R 25/102 | (2013.01) |
| G08G 1/00 | (2006.01) |
| G07C 5/00 | (2006.01) |
| G07C 5/08 | (2006.01) |

(52) U.S. Cl.
CPC ............... *G06F 17/00* (2013.01); *B60R 25/00* (2013.01); *B60R 25/102* (2013.01); *G08G 1/20* (2013.01); *G07C 5/085* (2013.01); *G07C 5/008* (2013.01)
USPC .......... 701/32.3; 701/32.4; 340/576; 340/990

(58) Field of Classification Search
CPC .......... G07C 5/008; G07C 5/085; G08G 1/20; B60R 25/00; B60R 25/102
See application file for complete search history.

(56) References Cited

U.S. PATENT DOCUMENTS

| | | | |
|---|---|---|---|
| 6,198,996 B1* | 3/2001 | Berstis ............................ 701/36 |
| 6,232,874 B1* | 5/2001 | Murphy .................. 340/426.19 |
| 7,548,491 B2 | 6/2009 | Macfarlane |
| 2003/0204290 A1 | 10/2003 | Sadler et al. |
| 2006/0066149 A1 | 3/2006 | Holloway et al. |
| 2007/0046425 A1 | 3/2007 | Booth |
| 2007/0143482 A1 | 6/2007 | Zancho |
| 2007/0188310 A1* | 8/2007 | Mori et al. ............... 340/426.36 |
| 2007/0265744 A1* | 11/2007 | Nicolai .......................... 701/35 |
| 2008/0093445 A1 | 4/2008 | Greaves |
| 2008/0255722 A1 | 10/2008 | McClellan et al. |
| 2008/0319602 A1* | 12/2008 | McClellan et al. ............. 701/33 |
| 2009/0069954 A1 | 3/2009 | Aladesuyi |
| 2010/0004818 A1 | 1/2010 | Phelan |
| 2010/0045452 A1 | 2/2010 | Periwal |
| 2011/0254655 A1 | 10/2011 | Maalouf et al. |

OTHER PUBLICATIONS

Bacheldor, Beth. 'USPS Uses RFID to Manage Vehicles, Drivers,' RFID Journal. Jul. 10, 2006. 2 pages.
RMTracking'GPS Tracking for Vehicle Tracking. [online] [retrieved on Aug. 12, 2011]. Retrieved from internet electronic mail: http://web.archive.org/web/20090416021731/http://www.rmtracking.com/ Apr. 16, 2009, 1 page.
Live View GPS'Live Trac PT-10. [online] [retrieved on Aug. 12, 2011]. Retrieved from internet electronic mail: http://www.liveviewgps.com/live+trac+pt-10+.html 3 pages.
Tiwi: drive aware'Fact Sheet. Jun. 4, 2008. 2 pages.

* cited by examiner

*Primary Examiner* — Michael J Zanelli
(74) *Attorney, Agent, or Firm* — Fish & Richardson P.C.

(57) ABSTRACT

Methods, systems and apparatus for vehicle control, tracking, and reporting. In an aspect, vehicle parameters that describe the current operation of the vehicle are compared to profile parameters of a driver. If the vehicle parameters are not within the operational limits defined by the profile parameters, an out of profile parameter process is performed. The out of profile parameter process includes wirelessly sending a violation report to an administrator device.

15 Claims, 7 Drawing Sheets

VEHICLE PROFILE CONTROL AND MONITORING

CROSS-REFERENCE TO RELATED APPLICATION

This application is a continuation application of and claims priority to U.S. application Ser. No. 12/822,539, filed on Jun. 24, 2010, entitled "Vehicle Profile Control And Monitoring," and which matured into U.S. Pat. No. 8,463,488 on Jun. 11, 2013, the entirety of is hereby incorporated herein by reference.

BACKGROUND

This disclosure relates to monitoring the operation of an automotive vehicle.

Owners of vehicles desire that other drivers of their vehicles operate the vehicles in a responsible and safe manner. For example, parents want to ensure that their adolescent children are driving responsibly and obeying the traffic laws of their jurisdiction. Likewise, fleet owners want to ensure that their drivers are also driving responsibly and obeying the traffic laws of their jurisdiction.

Systems that facilitate monitoring vehicle operation, however, often report data that is of little interest to an administrator (e.g., a person that manages the monitoring of the vehicle) and require monthly service fees and a suite of web-based tools. Likewise, many of these systems determine that a policy violation occurs in response to a vehicle parameter (e.g., location) being out of a specified operational parameter. This can lead to unnecessary reporting to the administrator, and cause unnecessary actions on the part of the administrator.

SUMMARY

In general, one aspect of the subject matter described in this specification can be embodied in a system that includes a processing subsystem, a communication subsystem that communicates over a wireless network, and a memory subsystem that stores: a plurality of user profiles, each user profile specifying a profile parameters for the user profile, the profile parameters defining operational limits for an automotive vehicle; an administrator profile, the administrator profile storing contact information for wirelessly providing data to an administrator device; and processing instructions that are executable by the processing subsystem and upon such execution cause the processing subsystem to perform operations comprising: determine a profile of a user that is in an operator role of a vehicle in which the vehicle device is installed; if the profile of the user in one of the user profiles, then: obtain vehicle parameters that describe the current operation of the vehicle, determine whether the vehicle parameters are within the operational limits defined by the profile parameters of the user profile of the user that is in the operator role of the vehicle; in response to determining that a vehicle parameter is not within the operational limits defined by the profile parameters, perform an out of profile parameter process that includes wirelessly sending a violation report to the administrator device by use of the communication subsystem. Other embodiments of this aspect include corresponding methods, apparatus, and computer program products.

Another aspect of the subject matter described in this specification can be embodied in system that includes a processing subsystem and a memory subsystem that stores: a student profile, the student profile associated with a user and storing credited driving time of the user in the operator role of the vehicle; an administrator profile, the administrator profile storing identification information for an administrator and an administrator password; a compliance profile, the compliance profile storing learning requirements for obtaining a license as required in a jurisdiction, the learning requirements including a minimum driving time specifying a minimum length of time that a learning user must drive a vehicle under the supervision of the administrator; processing instructions that are executable by the processing subsystem and upon such execution cause the processing subsystem to perform operations comprising: determining a profile of a user that is in an operator role of a vehicle in which the vehicle device is installed; in response to determining that the profile of the user that is in the operator role of a vehicle is the student profile, requesting the administrator password; in response to receiving and determining that the administrator password matches the administrator password stored in the administrator profile, crediting the driving time stored in the student profile for an amount proportional to the time that the vehicle is being operated by the user; determining whether the credited driving time exceeds the minimum driving time; and in response to determining whether that credited driving time exceeds the minimum driving time, generating a notification that the user has fulfilled the minimum length of time that a learning user must drive a vehicle under the supervision of the administrator. Other embodiments of this aspect include corresponding methods, apparatus, and computer program products.

Particular embodiments of the subject matter described in this specification can be implemented to realize one or more of the following advantages. Violation reports are provided in the context of a map indicating a current location of a monitored vehicle, providing the administrator with an "at-a-glance" view of the current vehicle location and a listing of violations, thus facilitating an assessment by the administrator.

The violations can be listed in the form of selectable dialogs, the selection of which provides detailed information regarding the violation, which can further facilitate a quick assessment by the administrator.

The violations can also be listed with a voice prompt, the selection of which establishes a voice communication with the vehicle device monitoring the vehicle, which further facilitates a quick assessment by the administrator.

The voice prompt can also include additional contact information of the driver, thus allowing the administrator to contact the driver by alternative means if the drive does not response to the voice communication established over the vehicle device.

Violations can be designated as instantaneous violations or threshold violations so as to minimize the unnecessary reporting of conditions that would constitute a violation until after the conditions have been occurring in excess of a threshold amount of time. For example, a driver may temporality exceed the speed limit to pass a slow moving vehicle and then resume driving at or below the speed limit. If the vehicle is exceeding the speed limit for only a period of time less that the threshold time (e.g., 30 seconds), a violation is determined to not have occurred, or a violation report is not transmitted.

When interfacing with the control system of the vehicle (e.g., the CAN bus and ignition), the vehicle device can be further configured to impose one or more security tests based on the user profile of the operator. For example, after a certain time of day (e.g., 11:00 PM) the driver of the car may be required to speak to the administrator before the ignition can be engaged, thus facilitating proactive assessment of the driver's condition by the administrator.

Compliance with local driving regulations regarding licensing requirements can be easily tracked and ensured by requiring an administrator password for a student driver, and allowing the crediting time in meeting such requirements only when the administrator password is provided. Time can also be efficiently credited for only when the student driver is operating the vehicle in compliance with local traffic laws. Cumulative driving time for graduated licenses can also be credited, and can also be efficiently credited for only when the licensed driver is operating the vehicle in compliance with local traffic laws.

The example advantages described above are optional advantages, and need not be realized in any particular implementation of the subject matter described in this specification. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
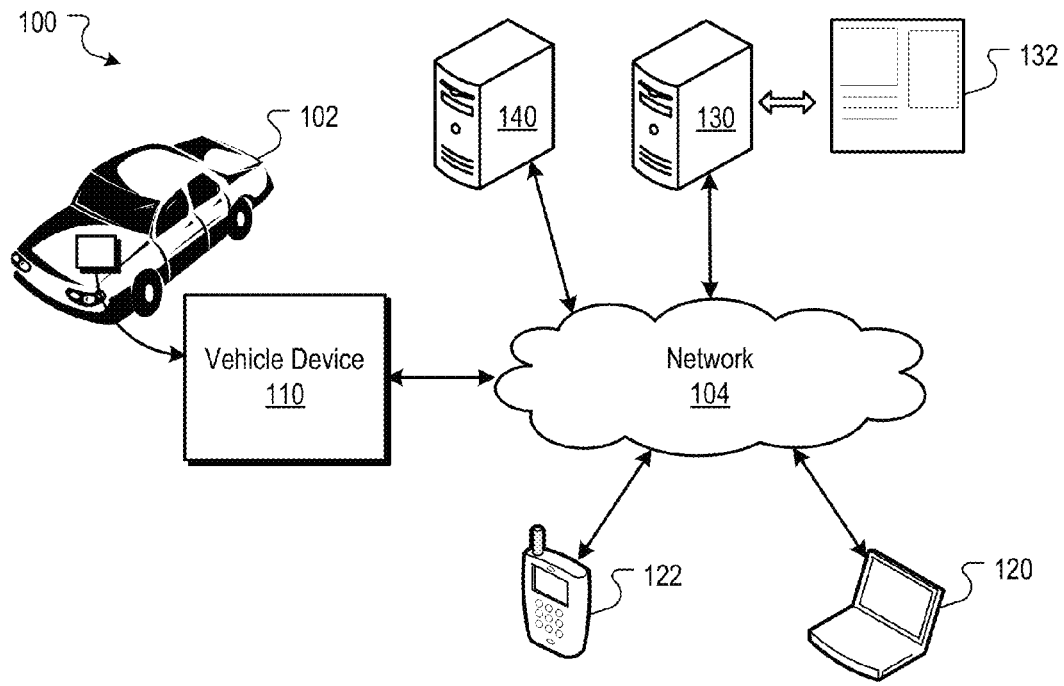
FIG. 1 is a block diagram of an example environment in which vehicle monitoring data is recorded, analyzed and reported.

FIG. 1 is a block diagram of an example environment 100 in which vehicle monitoring data is recorded, analyzed and reported. A vehicle 102 is fitted with a vehicle device 110 that can monitor vehicle parameters that describe the current operation of the vehicle and determine whether the vehicle parameters are within the operational limits defined by profile parameters of a user profile of a user that is in the operator role of the vehicle 102. The vehicle device 110 is described in more detail in FIG. 2.

The vehicle device 110 can communicate over a network 104, such as a 3G or 4G network, a GSM network, or other types of wireless communication networks. The network 104 may also include other networks that are connected by gateways, such as the Internet.

As will be described in more detail below, the vehicle device 110 can generate violation reports and send the violation reports to an administrator device by a wireless communication. For example, in some implementations, the vehicle device 110 can send a short messaging service (SMS) message to a mobile device 122. The mobile device 122 is equipped with software that can process the message and generate a map that illustrates the current location of the vehicle 102 and also describes the violation. In some implementations, the vehicle device 110 can provide the violation report to a server 130. The server 130 generates a web page 132 that includes a map that illustrates the current location of the vehicle 102 and also describes the violation, and provides the web page an electronic device, such as a personal computer 120, or the mobile device 122.

In some implementations, a vehicle monitoring server 140 that implements a vehicle monitoring service in cooperation with the vehicle device 110 can also be used. The vehicle monitoring service can, for example, be a subscription service that provide long term storage of profile data of subscribers, and provides some of the end-client features described below as an "in the cloud" service.

Figure 2:
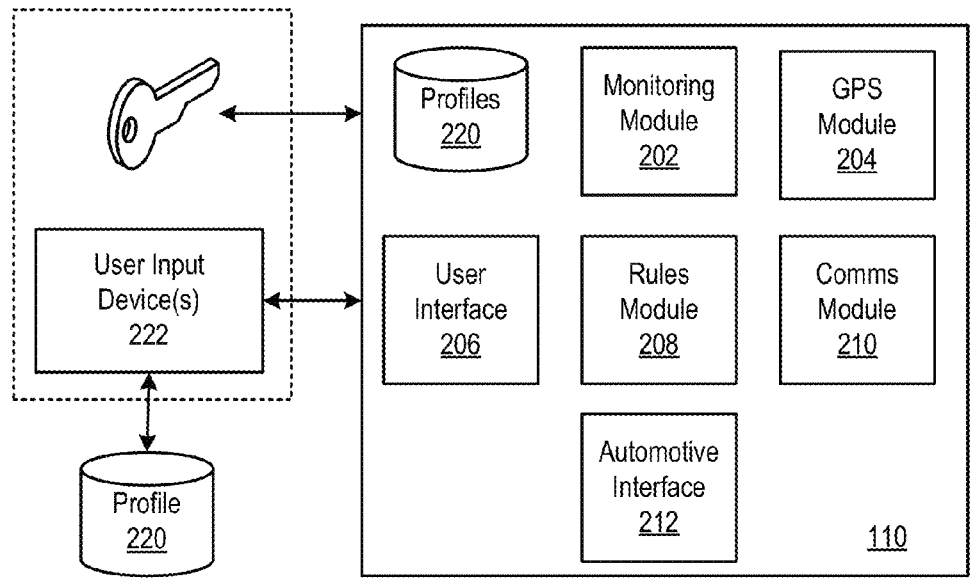
FIG. 2 is a block diagram of a vehicle device and a user input device.

FIG. 2 is a block diagram 200 of a vehicle device 110 and a user input device 222. The example vehicle device 110 is packaged so that it may be easily mounted in the vehicle 102, e.g., beneath the dashboard, inline with the ignition, etc. The device 110 includes a monitoring module 202, a global positioning system (GPS) module 204, a user interface 206, a rule module 208, a communication (comms) module 210, and an automotive interface 212.

The monitoring module 202 and rules module 208 can be implemented in software on a processing device, such as a microprocessor, application specific integrated circuit (ASIC), etc. The GPS module 204 may include GPS processing circuit and be in data communication with GPS satellites to determine latitude and longitude coordinates, or, alternatively, may be a communication interface that communicates with a separate GPS system. By use of the GPS module, the vehicle device 110 can obtain vehicle parameters such as location and current speed.

The automotive interface 212 can communicate with a vehicle control system. In some implementations, the automotive interface communicates with one or more on-board vehicle computers that communicate over the Controller Area Network (CAN) bus, and receives and transmits data over the CAN bus according to the CAN message frames. By use of the automotive interface 212, the vehicle device 110 can obtain vehicle parameters such as current speed, seat belt status, engine status, and other data that are communicated over the CAN bus in message frames.

A memory device stores instructions that are executable by the processing device, e.g., instructions that define the monitoring module 202 and rules module 208. The memory device also stores profiles 220. The profiles include user profiles and an administrator profile. Each user profile specifies profile parameters for the user profile, and each profile parameter defines operational limits for an automotive vehicle for that user. Example operational limits are maximum speed, driving area, maximum range, and the like. The user profile can also include other data, such as the user's name, a user's phone number, and whether one or more security tests to be applied and the conditions under which the tests are to be applied. The user profile is maintained by the administrator.

The administrator profile stores contact information wirelessly providing data to an administrator device associated with the administrator. For example, if the administrator elects to receive SMS messages, the contact information is an SMS number. Likewise, if the administrator elects to receive e-mail messages, the contact information includes an e-mail address. The vehicle device 110, by use of the communication module 210, can contact the administrator device using the contact information.

The user input devices 222, in some implementations, include electronic data storage devices in which a profile for a user is stored. For example, the user input device 222 can be a universal serial bus (USB) memory device in which the user profile 220, or alternatively a user identifier, is stored. As will be described in more detail below, when the user wants to operate the vehicle, the user inserts the memory device into the user interface 206 so that the vehicle device 110 can identify the user.

In some implementations, the user device 222 can be integrated with a smart car key. In these implementations, the user device 222 can automatically identify the user to the vehicle device 110 when the user inserts the key into the ignition, or when the vehicle device 110 is within a signal transmission range of the smart car key.

In still other implementations, the user interface 206 can include a keypad by which the user can enter a user identifier, such as a four digit personal identification number, that identifies the user, and which, in turn, identifies the profile 220 associated with the user.

Figure 3:
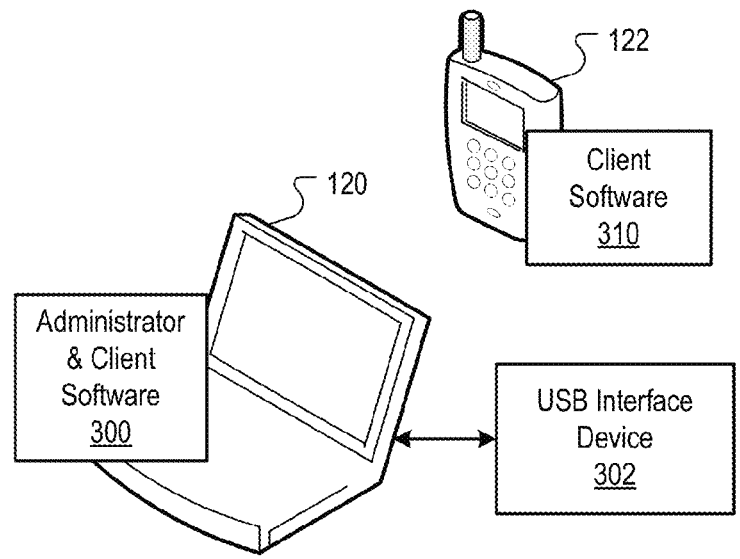
FIG. 3 is a block diagram of a personal computer equipped with administrator and client software 300 for the vehicle device, and a mobile device equipped with client software for viewing and processing violation reports.

FIG. 3 is a block diagram of a personal computer 120 equipped with administrator and client software 300 for the vehicle device 110, and a mobile device 122 equipped with client software 310 for viewing and processing violation reports.

The administrator and client software 300 provides a user interface by which an administrator can configure and manage the vehicle device 110. In some implementations, the vehicle device 110, by use of the user interface 206, can mate with a USB interface device 302 that can be connected to the computer 120. Alternatively, a memory device, such as a USB drive or a user input device 222 associated with the administrator can be used to store configuration data for the vehicle device 110. The administrator can then access the vehicle device 110 in an administrative mode (e.g., by inputting an administrative PIN number), and download the configuration data to the vehicle device 110 to configure the vehicle device 110.

The administrator, by use of the software 300, can configure multiple user profile and specify specific profile parameters for each user profile. For example, if the administrator is a parent of two children, each of which has obtained a driver's license, the administrator may develop a different profile for each child. Alternately, if the administrator is a fleet owner, the administrator may develop profiles for each driver role, e.g., a first profile for a delivery truck driver, a second profile for a long range freight carrier driver, etc.

Developing each profile can be facilitated by use of a user interface. For example, the user interface can includes files in which the administrator can input a profile name, a maximum speed, a maximum range, security testing requirements, and specific rules that are to be applied to the user profile. In some implementations, the user interface can include a map interface through which the administrator can selectively define an allowed operational area for a user, e.g., a city radius, etc.

There are several installation configurations for the vehicle device 110. In some implementations, the vehicle device 110 does not interface with the automotive system, e.g., the vehicle device 110 need not include the automotive interface 212. In these implementations, the user can insert a user input device 222 that the user has been provided by the administrator and which includes the user's profile or and identifier that identifies the user. Alternatively, the user may enter a PIN by use of the user interface 206.

In vehicle device 110 does interface with the automotive system, then, in some implementations, the vehicle device 110 can also identify the user by use of a smart key user device 222, in addition to or in lieu of a separate user input device 222 or PIN number input.

If the profile of the user is a profile specified by the administrator and is not an administrator profile, then the vehicle device 110 obtains vehicle parameters that describe the current operation of the vehicle. The vehicle parameters can include the current location and speed, as provided by the GPS module 204, and, if the vehicle device is in communication with the automotive system, additional vehicle parameters, such as seat belt status, tire pressure status, fuel levels. The vehicle device 110, by use of the monitoring module 202 and the rules module 208, determines whether the vehicle parameters are within the operational limits defined by the profile parameters of the user profile of the user that is in the operator role of the vehicle. If the vehicle parameters are within the operational limits defined by the profile parameters, then the vehicle parameters are logged in the memory storage device. However, if the one or more vehicle parameters are not within the operational limits defined by the profile parameters, then the vehicle device 110 executes an out of profile parameter process. As will be describe in more detail below, the output of profile parameter process can vary depending on the profile and the rules defined in the rule module 208.

Additionally, the vehicle device 110 can also wirelessly send a violation report to the administrator device by use of the communication module 210. In some implementations, the violation report is sent to the administrator device by an SMS message to the administrator device. The SMS message includes, for example, a vehicle identifier, a profile identifier, that date and time, the out of parameter conditions (e.g., over speed data, out of driving area data, etc.), and location data that specifies the location of the vehicle in which the vehicle device 110 is installed.

The administrator device, upon receiving the violation report, can present a user interface in which the violation data are graphically represented, and through which one or more options may be taken by the administrator.

Figure 4A:
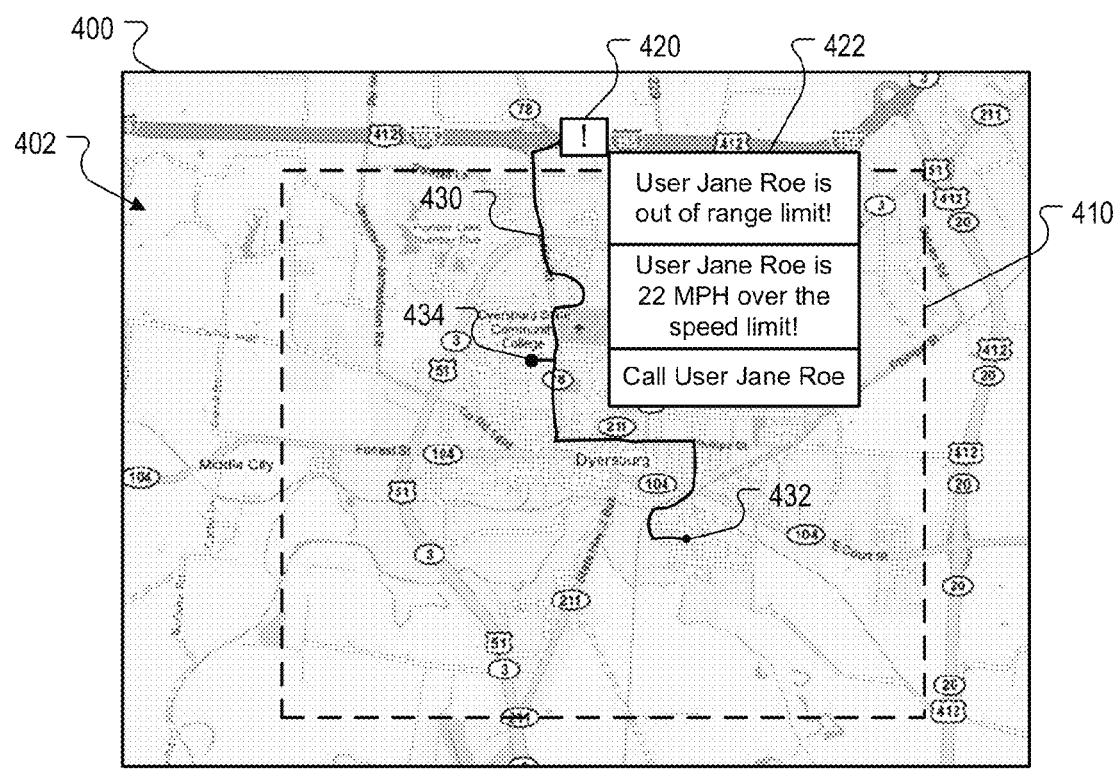
FIGS. 4A-4C are illustrations of an example user interface 400 for a violation report.
Figure 4B:
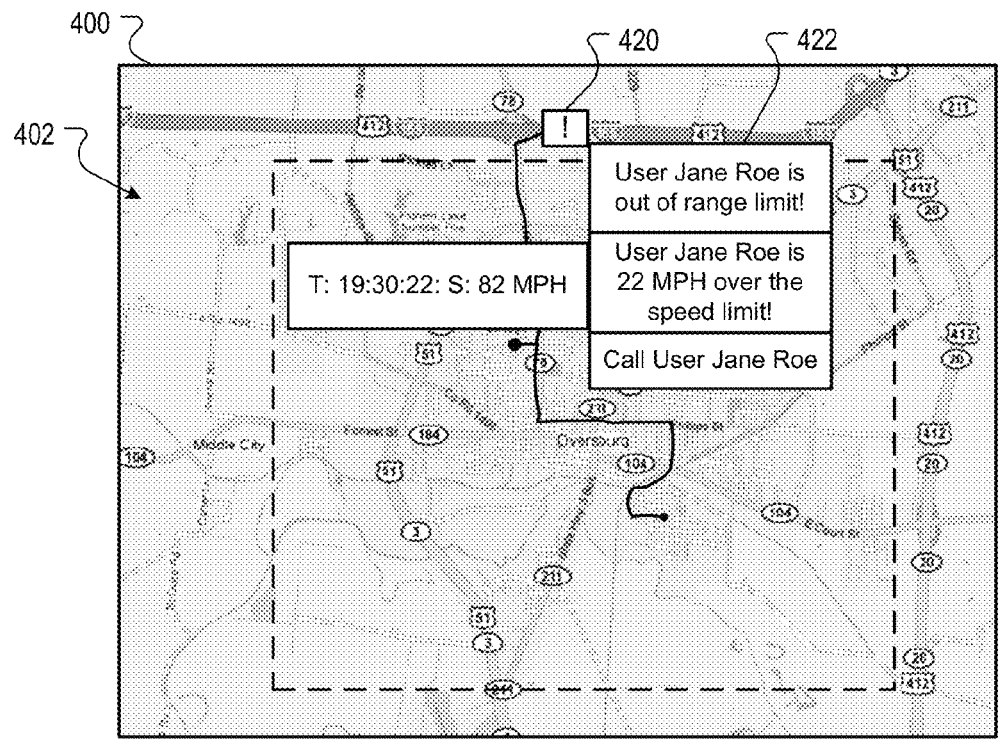
Figure 4C:
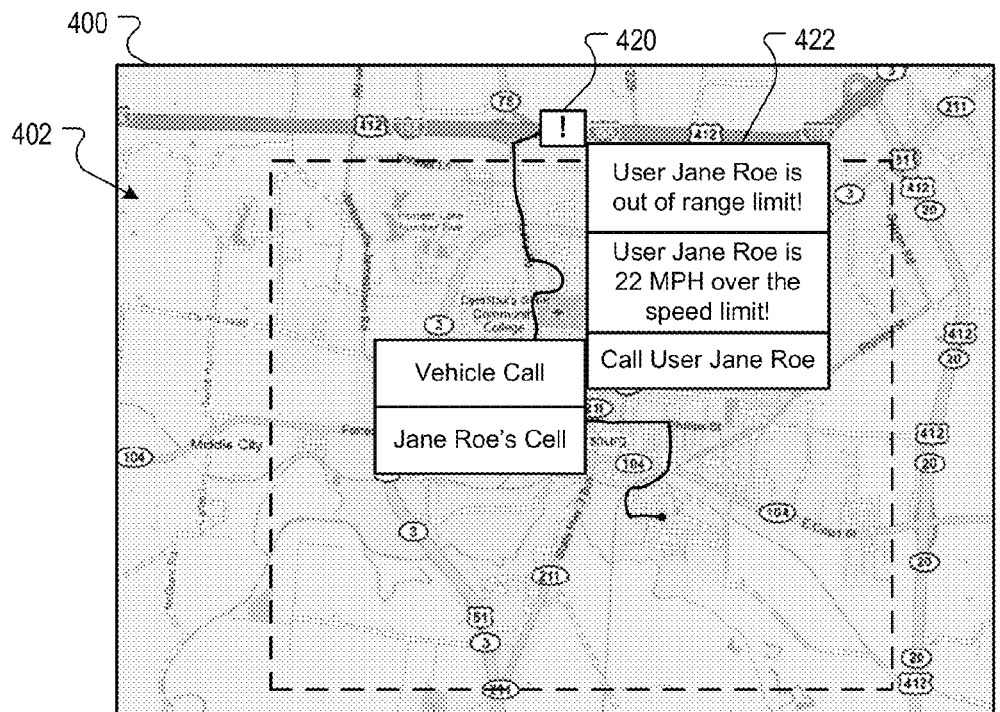

FIGS. 4A-4C are illustrations of an example user interface 400 for a violation report. The user interface 400 can be generated on both of the personal computer 120 and the mobile communication device 122. In some implementations, the client software 310 is configured to generate the user interface 400 in response to the mobile communication device 400 receiving a violation report by an SMS message.

In some implementations, the client software 310 causes the device 122 to retrieve the location data (e.g., latitude and longitude data) from the violation report SMS message, and renders a render a map 402 on a display device. The map includes the location specified by the latitude and longitude coordinates. In some implementations, the map data are stored on the device 122. In other implementations, the device 122, using the client software 310, contacts a publicly accessible map server to request the corresponding map data to render the map.

The device 122 then renders an icon 420 identifying the location of the vehicle, and also renders a message 422 that describes the vehicle parameters that are not within the operational limits. As shown in FIG. 4A, the driver, Jane Roe, is operating the vehicle in such a manner that two vehicle parameters are out of her profile parameters. The first profile parameter that has been violated is a range limit, e.g., the vehicle is outside on the bounded region 410 defining an area in which the drive may operate the vehicle in compliance with her profile. The second profile parameter that has been violated is a speed limit. Here, the driver is driving 22 miles per hour over a speed limit.

In some implementations, as shown in FIG. 4B, the administrator may select a particular violation dialog, such as by use of a mouse, touch screen display, or a trackball, and receive additional details regarding the particular violation. Here, the administrator has selected the speeding violation dialog, and the time of the violation and the speed of the vehicle are shown.

In some implementations, the profile parameters define absolute limits and relative limits. An absolute limit is a limit that is predefined to a certain value or condition, and is violated if a vehicle parameter does not comply with the certain value or limit. For example, a maximum speed or area boundary are absolute limits.

A relative limit is associated with operational limit that varies according to the current location of the vehicle. For example, a relative speed limit might be +5 miles an hour, and thus when the vehicle is moving at a rate in excess of 5 miles an hour over a given speed limit, a violation occurs. The given speed limit varies according to the location of the vehicle and the time of day; for example, a given speed limit in a school zone may be 15 miles an hour during certain hours and weekdays, and 25 miles an hour all other times. Likewise, a given speed limit for an interstate highway may be 60 miles an hour. In some implementations, the relative limit is ignored for certain areas. For example, a school zone speed limit may be treated as an absolute limit, as it is especially important to obey the speed limit in school zones. The given limits can be determined from map data stored in or provide to the administrator device 122. For example, the map data may include posted speed limits for roads and highways on the map.

In some implementations, the profile parameters define threshold limits and instantaneous limits. An instantaneous limit is a limit or condition that is violated immediately upon a vehicle parameter not complying with the limit or condition. For example, if a maximum speed of 75 miles an hour is set as an instantaneous limit, then a violation occurs as soon as the vehicle is moving in excess of 75 miles an hour.

A threshold limit is a limit or condition associated with a respective threshold time period, and is only violated an when the vehicle parameter has not been within a threshold limit or condition in excess of the threshold time period associated with the threshold limit. For example, a driver may temporality exceed the threshold speed limit to pass a slow moving vehicle and then resume driving at or below the speed limit. If the vehicle is exceeding the speed limit for only a period of time less that the threshold time (e.g., 30 seconds), a violation is determined to not have occurred. In some implementations, the vehicle device 110 can generate an audible warning in response to determining that the vehicle parameters are not within the operational limits defined by the threshold limit for a period of time that is not in excess of the threshold time period associated with the threshold limit. For example, after 15 seconds, the vehicle device can generate a multi-beep tone indicating a warning that the vehicle device 110 will report a violation soon if the vehicle parameters do not return to a state of compliance with the profile parameters.

Included in the message 422 is a voice call initiation prompt "Call User Jane Roe." The voice call initiation prompt is selectable, and upon such selection causes the administrator device 122 to place a call to the vehicle device 110. The vehicle device 110, by use of the communication module 210 and the user interface 206, has a speaker phone capability, and can automatically answer an incoming call from the administrator device 122, thereby establishing a communication between the drive and the administrator almost in real time with the occurrence of a violation.

In some implementations, the profile 220 of the user also stores alternate contact information for the user, e.g., a separate cell phone number of the user. This feature is useful if the administrator reads the violation report after much time has passed from when it was received, e.g., the administrator may have left the device 122 in another room and an hour has passed since the device 122 received the violation report. During that time, the user may have left the car, but may still be in possession of a cell phone. Thus, selection of the voice call initiation prompt, in some implementations, provides a subsequent selection menu that provides a first option to initiate a voice call to the vehicle device, and a second option to initiate a call the cell phone of the user.

Additional data can also be shown in the user interface 400. For example, by use of one or more SMS messages, a user's driving history can be indicated by a path 430. Significant events, such as where the user started and stops of long durations, e.g., longer than five minutes, can be indicated by respective event icons 432 and 434, respectively. Selection of an event icon 432 and 434 or a portion of the path 430 can provide additional details regarding the vehicle performance parameters at that point in the path, e.g., speed, time, etc.

In some implementations, the SMS messages that provide the path data are formatted in a path format. One example path format is a series of times stamps and latitude and longitude coordinates. Multiple time stamps and coordinates can be provided in a single SMS message, and the vehicle device 110 can provide the path data in response to a request from the administrator device 122. In some implementations, the vehicle device 110 can send path data that describes the entire path taken by a particular user over a time period, e.g., the most recent six hours. In other implementations, the vehicle device 110 can send a predefined number of SMS messages, e.g., three, that include the most recent path data. The administrator may then request additional path data by use of the device 122 to receive the next most recent set of path data, e.g., another three SMS messages that include path data.

In some implementations, the administrator can query the vehicle device 110 for a vehicle status, and can receive the current speed, location, and other vehicle parameters associated with the current operation of the vehicle. If the vehicle device is in data communication with the CAN bus, additional vehicle parameters obtained from the CAN bus, e.g., seat belt status, etc., can also be provided.

As described above, in some implementations, many of the client features described above can also be realized by a cloud-based service provided by a vehicle monitoring server 140. The cloud based service is typically used by enterprises or other entities or persons that desire to ensure compliance by a large number of drivers. For example, a local trucking service may opt for cloud support rather than client side only support for ease of access from many different locations (e.g., difference offices) and for data storage.

FIGS. 5-8 below are example processes that can be used in the vehicle device 110. The example processes are described in the context of the device 110 being in data communication with the automotive system by use of the automotive interface. However, the vehicle device 110 can also operate in a stand-alone mode to provide reporting to the administrator, without the additional controls described below.

Figure 5:
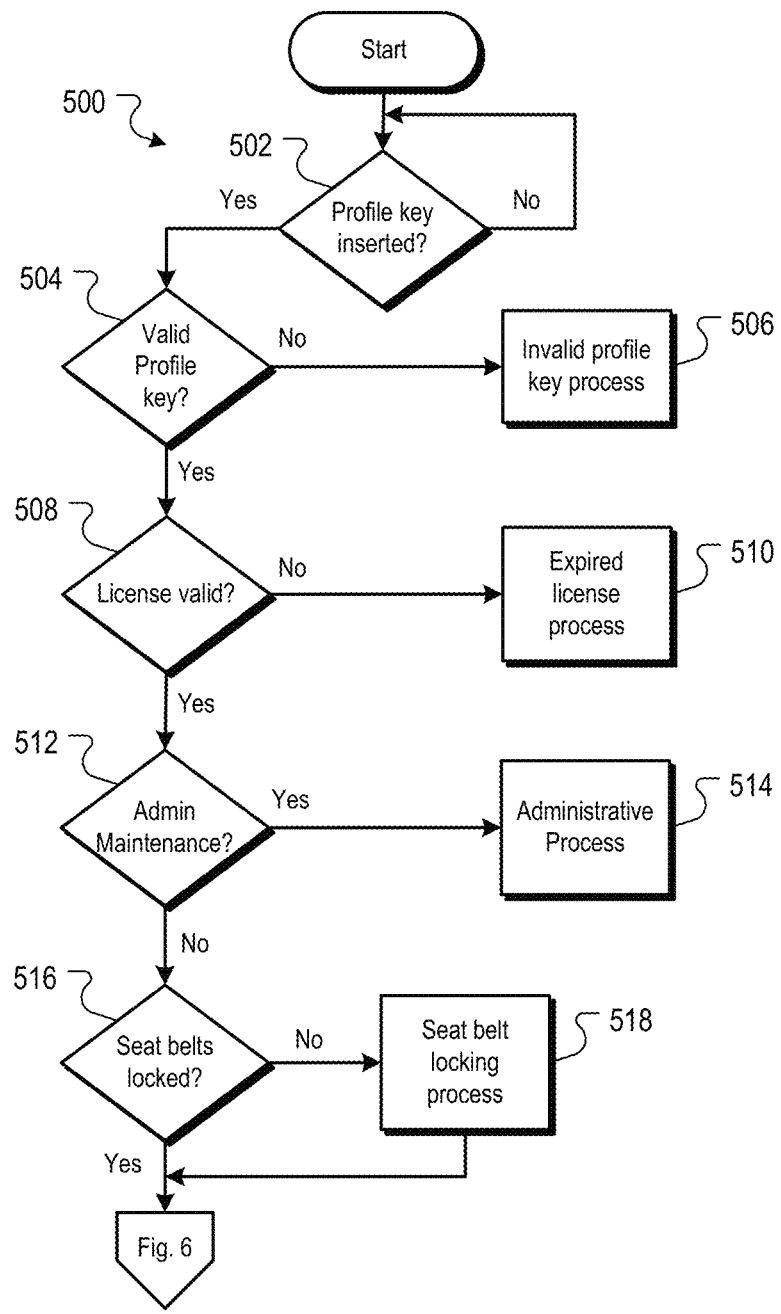
FIG. 5 is a flow diagram of an example process for determining a user profile of a driver.

FIG. 5 is a flow diagram of an example process 500 for determining a user profile of a driver. The process 500 can be implemented in the vehicle device 110.

The process 500 determines a profile key is inserted (502). For example, the process determines if a user device 122 is inserted into the user interface 206. If a key has not been inserted, the process 500 continues to monitor for a key insertion.

When a key insertion is monitored, the process 500 determines if the key is a valid profile key (504). If the key is not a valid profile key, e.g., the key does not store a valid profile or store a user identifier that is stored in the memory of the vehicle device 110, then an invalid profile key process is performed (506). An example invalid profile key process can be an audible or visual indicator that an invalid or unknown profile is being used.

If the key profile is valid, the process determines if the license to use the device 110 is valid (508). For example, in some implementations, a monthly license fee can be required. If the license is not valid, then an expired license process is performed (510). For example, the user can be notified that the device 110 will not report or provide any vehicle control features until the license is renewed, and the user may operate the vehicle normally.

If the license is valid, the process determines if there is an administrative process to be performed (512). For example, the administrator may intend to load profiles into the vehicle device memory. If so, the administrative process is performed (514).

If there is not an administrative process to be performed, the process 500 determines if the seat belts are locked (516). For example, the vehicle device 110 may interface with the CAN bus or the on-board diagnostic (OBD) port to determine a seat belt lock status.

If the seat belts are not locked, the process 500 performs a seat belt locking process (518). For example, the process 500 can preclude further operation of the vehicle until the seat belts are fastened. Alternatively, the process 500 can allow further operation of the vehicle, and will require that the seat belts be fasted within a predetermined time period (e.g., a one minute warning period as indicated by a blinking LED or displayed message). If the seat belts are not locked at the expiration of the period, then a message indicating the non-compliance is sent to the administrator.

Figure 6:
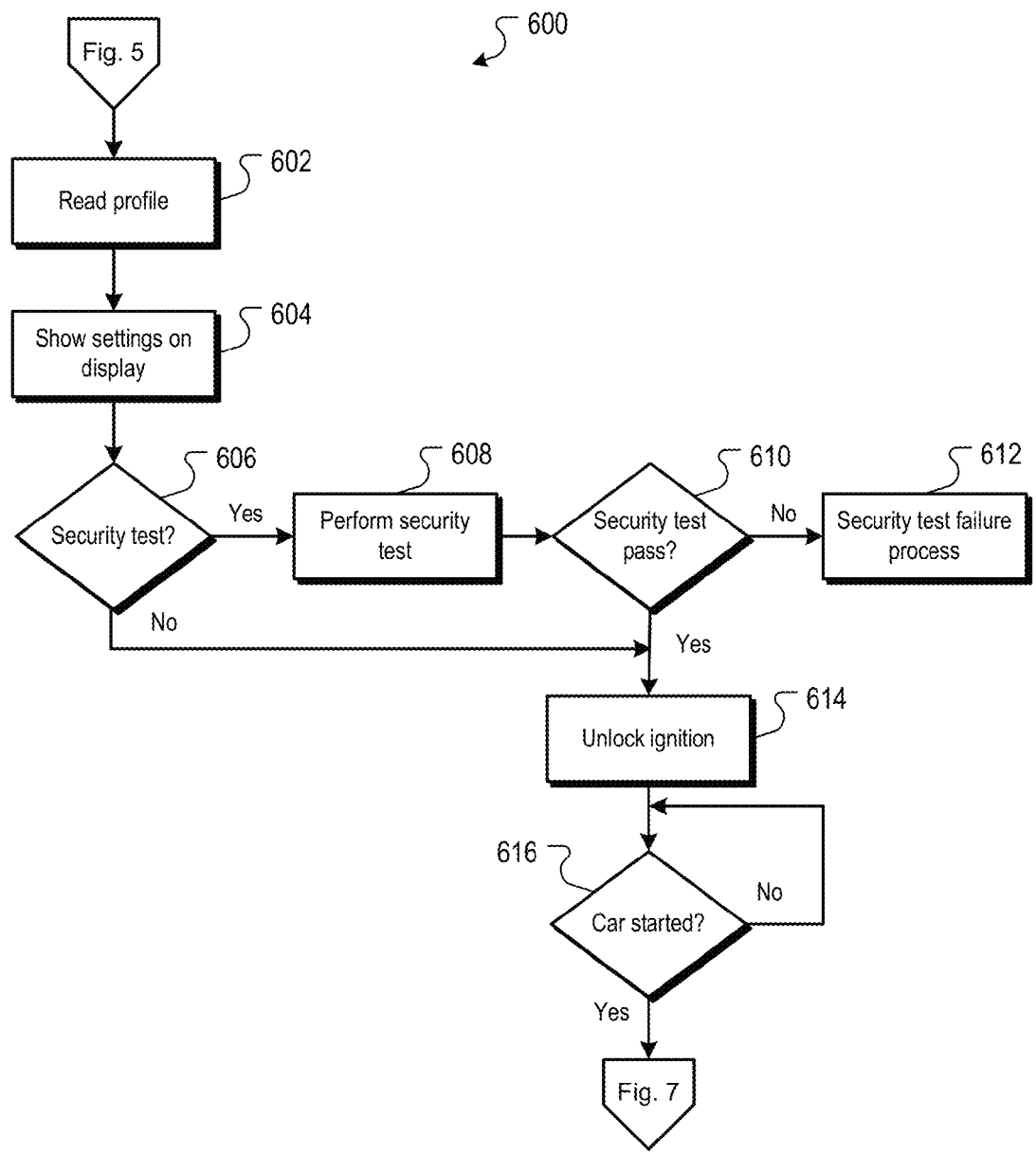
FIG. 6 is a flow diagram of an example process for a security test based on a user profile.

FIG. 6 is a flow diagram of an example process 600 for a security test based on a user profile. The process 600 can be implemented in the vehicle device 110.

The process 600 reads the profile (602), and, if a display device is used, can show the settings on the display (604). For example, after reading the profile, the vehicle device 110 can display the user name of the user that is in the role of operating the vehicle, and one or more profile parameters, such as maximum speed.

The process 600 determines if a security test is required (606). If a security test is required, the process performs the test (608), and determines if the test is passed (610). A variety of security tests can be used, and can be conditioned on being applied according to the rules module 208. For example, if the vehicle is attempted to be used at an unusual time relative to relative to a normal usage pattern, e.g., after 11:00 PM and before 6:00 AM, a security test may be invoked. The security test may involve, for example, establishing a voice communication with the administrator and receiving an acceptance by the administrator in a follow-up message. For example, the user may verity that he or she is the user identified and is in proper condition to drive the car. The administrator, by use of the client software, may then, after the voice call, send a message to the vehicle device indicating the security test has passed.

Other security tests can also be used, e.g., a breathalyzer test, a password input by used of keypad, etc. For example, in some implementations, the vehicle device has a lighted keypad, and the driver is required to repeat a pattern that is indicated by selected lighting of keys of the keypad, e.g., the keys may illuminate in a random sequence, such as 9-4-5-1-8, and the driver must input the sequence before the ignition can be engaged.

If the security test does not pass, then the process performs a security test failure process (612). For example, the user may be notified of the failure and that the user will be precluded from further use of the vehicle.

Returning to the keypad repetition example, after several attempts, e.g., three, without success, the vehicle device may establish a voice communication with an administrator, who may then unlock the system at the request of the driver. For example, the administrator may ask the driver several questions, and provided the administrator is satisfied with the answers, the administrator may send an SMS message to the vehicle device to unlock the ignition. The SMS message can, for example, be a text pass code for remotely unlocking the ignition, and which is specified by the administrator. The administrator may send the message to the vehicle device manually, or may alternatively use the client software 310 to invoke a command that sends the SMS message.

If the security test does pass, or if no security test is required, the process 600 unlocks the ignition (614), and awaits for the vehicle to start (616).

Figure 7:
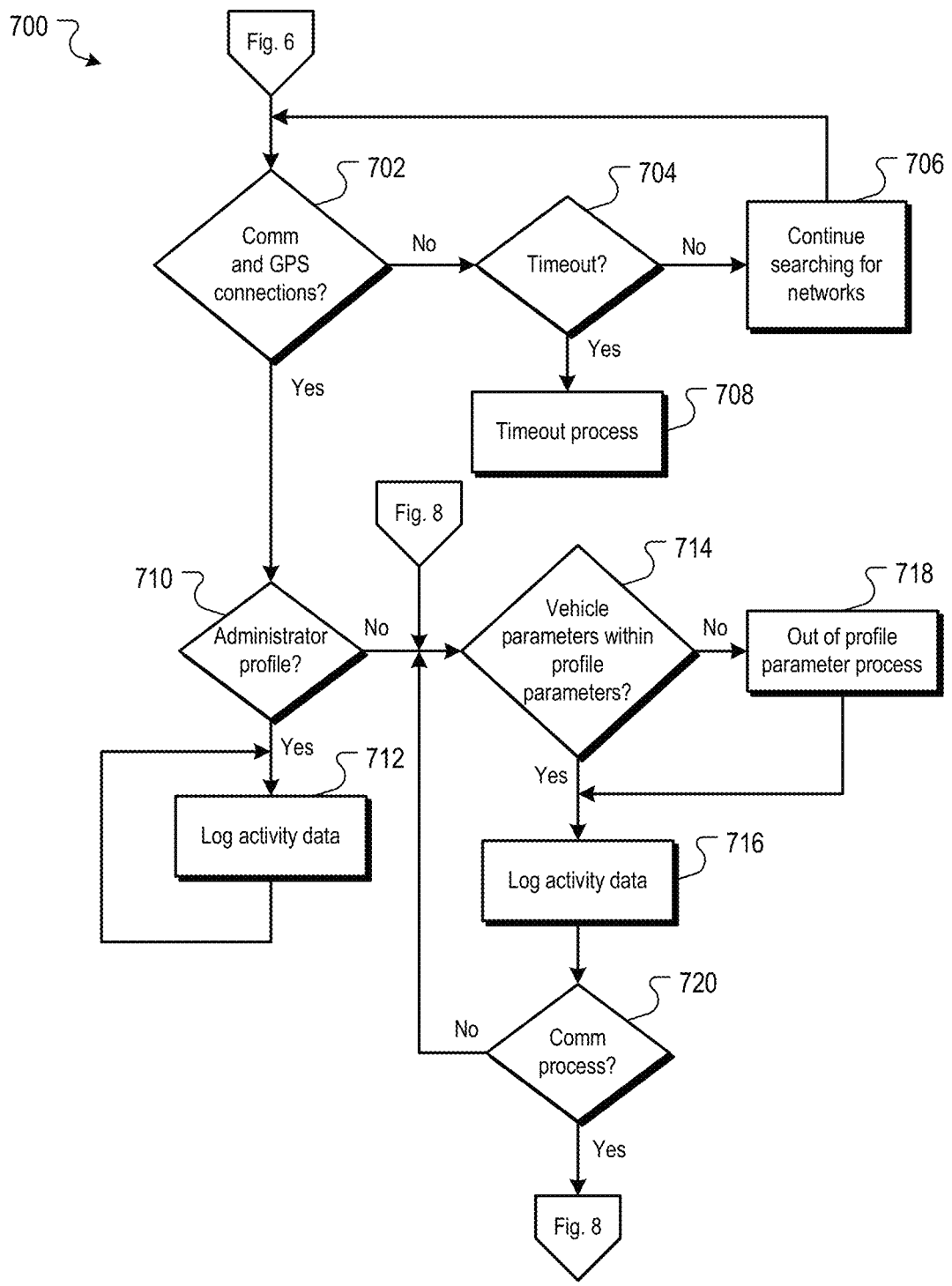
FIG. 7 is a flow diagram of an example process for monitoring vehicle parameters based on the determined profile.

FIG. 7 is a flow diagram of an example process 700 for monitoring vehicle parameters based on the determined profile. The process 700 can be implemented in the vehicle device 110.

The process 700 determines if the communication subsystem and the GPS subsystem have operational connections with their respective networks (702). If the communication subsystem and the GPS subsystem do not have operational connections with their respective networks, the process 700 determines if a timeout has occurred. If a timeout has occurred, a timeout process is performed (708). For example, the vehicle device may resume searching for the networks after a period of time, e.g., five minutes, and otherwise allow full use of the vehicle.

If a timeout has not occurred, the process 700 continues searching for the respective networks (708).

Once the communication subsystem and the GPS subsystem have operational connections with their respective networks, the process 700 determines if the driver of the vehicle (the user that is assuming the operational role of the vehicle) is associated with an administrator profile (710). For example, if the profile key identifies the administrator, then the process determines that the administrator profile is being used, and only the vehicle activity data is logged in the memory of the vehicle device and associated with the administrator profile (712).

Conversely, if the process 700 determines the driver is not the administrator but instead is a user associated with a user profile, then the process 700 determines whether the vehicle parameters are within the operational limits defined by the profile parameters of the user profile of the user that is in the operator role of the vehicle (714). If the vehicle parameters are within the operational limits defined by the profile parameters, then the vehicle activity data is logged in the memory of the vehicle device and associated with the user profile (716).

If the vehicle parameters are not within the operational limits defined by the profile parameters, then the process 700 performs and out of profile parameter process (718). The out of profile parameter process may depend on the parameters that are not within profile parameters, and the types of profile parameters, e.g., absolute, relative, instantaneous and threshold parameters as described above. The out of profile parameter process may do nothing, or alternatively may generate a warning, or may decide that a violation report be generated, as described above.

In some implementations, the out of profile parameter process may also limit the speed of the vehicle so that the vehicle resumes a speed that complies with the profile parameters. For example, accelerator position data transmitted over the CAN bus can be modified so that the maximum speed of the vehicle is limited. The limiting function can be overridden by the administrator at the request of the user. For example, the user can place a voice call to the administrator, or actuate a button on the device 110 that sends a request to the administrator to remove the governing function. After speaking to the user or receiving the message, the administrator can use the administrator device 122, with the software 310, to send a message to the vehicle device 110 to remove the override.

The vehicle activity data is logged in the memory of the vehicle device and associated with the user profile (716).

The process 700 determines if a communication process is required (720). If a communication process is not required, the process 700 returns to stage 714. Otherwise, the process performs the communication process (e.g., generates a violation report and/or establishes a voice communication with an administrator).

In some implementation, the vehicle activity data that is logged in the memory of the vehicle device and associated with user profiles can be stored for an extended period, e.g., six months, effectively logging a long-term driving record of each particular driver. The administrator and client software 300, and/or the client software 310, (or, alternatively, the server 140) can download the history and conduct various trend analysis processes, e.g., average speed, percentage of time driving in excess of speed limits; percentage of stop signs disobeyed or complied with; average trip length, etc. The trends can be derived, in part, from traffic requirements (e.g., stops, speed limits, etc.) that can be obtained from map data stored on the vehicle device 110 or provided by third parties.

Figure 8:
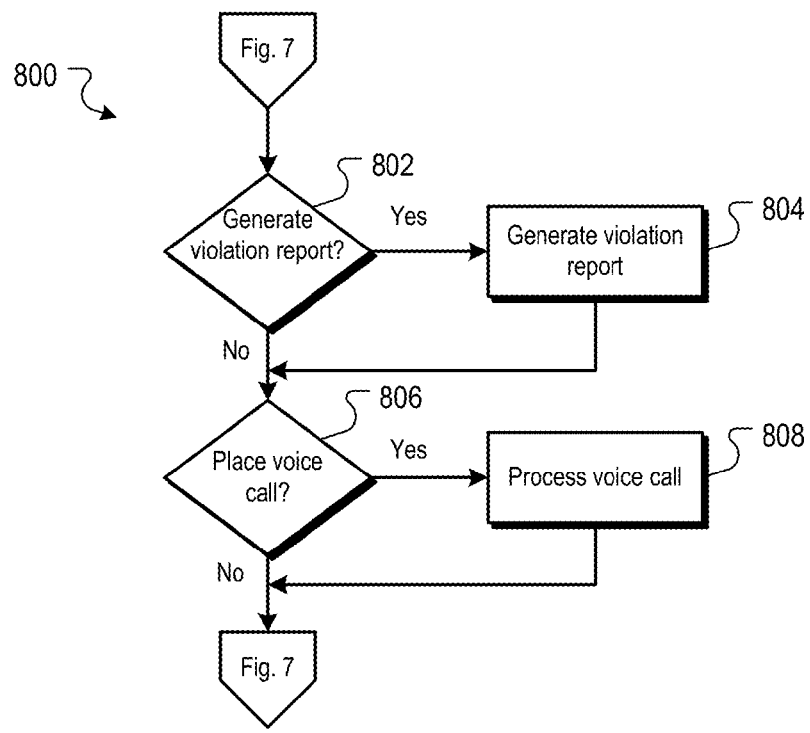
FIG. 8 is a flow diagram of an example process for a communication process.

FIG. 8 is a flow diagram of an example process 800 for a communication process. The process 800 can be implemented in the vehicle device 110.

The process 800 determines if a violation report is to be generated (802). If a violation report is to be generated, the process 800 generates the violation report (804), e.g., sends a message to the administrator device.

The process then determines if a voice call is to be placed (806). In some implementations, the vehicle device 110 can automatically place a voice call to the administrator in response to generating a violation report. In other implementations, the vehicle device 110, by use of the rules module 208, may only place calls when certain violations occur, e.g., speeding in excess of a maximum speed, driving outside of an approved area, etc.

If a voice call is to be placed, the process 700 places the voice call (808). Otherwise, the process returns to stage 714 of FIG. 7.

Figure 9:
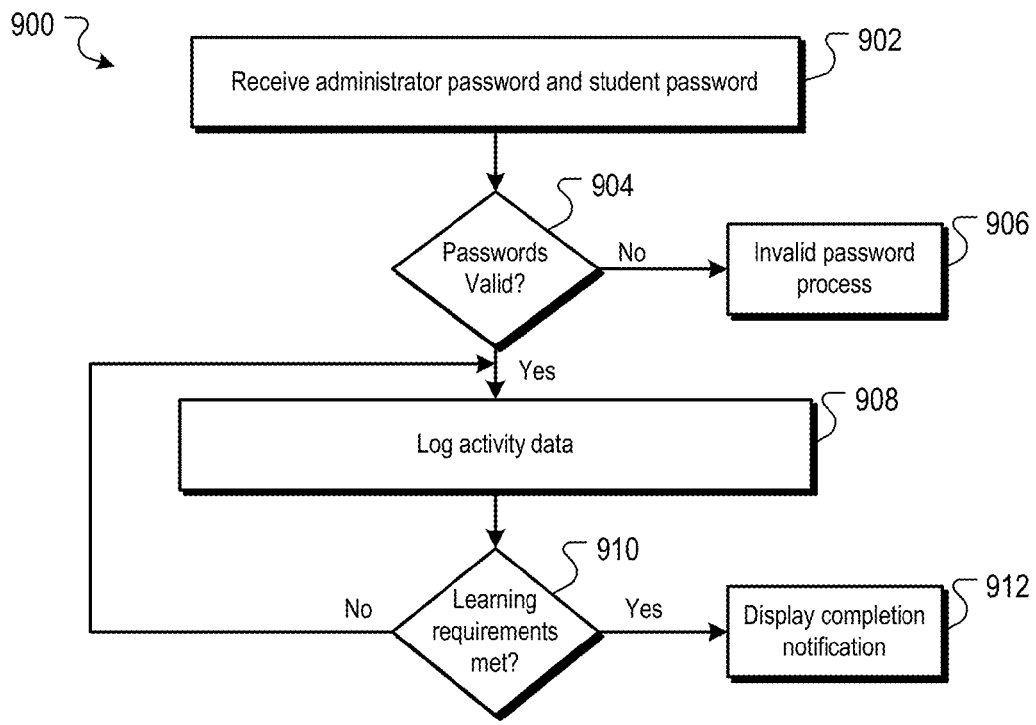
FIG. 9 is a flow diagram of an example process of tracking jurisdictional requirements for obtaining an operator's license.

FIG. 9 is a flow diagram of an example process 900 for tracking jurisdictional requirements for obtaining an operator's license. The process 900 can be implemented in the vehicle device 110.

In some implementations, the vehicle device 110 can be used to track compliance with local licensing requirements. The vehicle device 110 stores a student profile associated with a user. The student profile includes credited driving time of the user in the operator role of the vehicle. The vehicle device 110 also stores an administrator profile that includes identification information for an administrator and an administrator password. The device 110 also stores a compliance profile that stores learning requirements for obtaining a license as required in a jurisdiction. The learning requirements include a minimum driving time specifying a minimum length of time that a learning user must drive a vehicle under the supervision of the administrator.

In operation, the process 900 receives an administrator password and a student password (902). These can be input by the administrator and the student. The process determines if the passwords are valid (904). If the passwords are not valid, then an invalid password process is performed (906). For example, the device 110 may display that the passwords are invalid and that no time will be credited to the student profile.

If the passwords are valid, then the process 900 logs the activity data (908). During the logging, the process credits the driving time stored in the student profile for an amount proportional to the time that the vehicle is being operated by the user. The process 900 determines whether the credited driving time exceeds the minimum driving time, i.e., whether the learning requirements are met (910). If the learning requirements are not met, the process 900 continues to log the activity data; otherwise, the process displays a completion notification (912). The notification notifies the user that the user has fulfilled the minimum length of time that a learning user must drive a vehicle under the supervision of the administrator.

In some implementations, the student profile specifies profile parameters defining operational limits for an automotive vehicle, and crediting the driving time of stored in the student profile for an amount proportional to the time that the vehicle is being operated by the user only occurs if the vehicle is being operated by the user with the vehicle parameters being within the operational limits.

In some implementations, a graduated licensee profile can be used in jurisdictions that have graduated drivers license requirements, and time can be credited according to specific requirements of each licensee profile, which differ from each other. For example, a jurisdiction may have a graduated drivers license program that includes a permit phase, an initial licensee phase, and a full licensee phase. Each of the permit phase and initial licensee phase may have particular driving requirements, e.g., the permit licensee phase may have a nighttime driving restriction is in place Sunday-Thursday, 10 p.m-6 a.m., and Friday-Saturday, 11 p.m.-6 a.m., and may also require driving a minimum of 50 hours, including 10 hours of nighttime driving, supervised by a fully licensed driver. Likewise, the initial licenses phase may require at least 200 hours of unsupervised daylight driving and/or supervised nighttime driving before a full license can be obtained, and requires that nighttime driving from Sunday-Thursday, 10 p.m-6 a.m., and Friday-Saturday, 11 p.m.-6 a.m. can only be credited when supervised by a fully licensed driver.

The process 900 can be modified to credit time for each graduated licensee profile. For example, to credit time for the permit phase, the vehicle device 110 will require both passwords for the fully licensed driver and the permit phase driver, and will also require that the time requirements of 50 hours total, of which 10 hours are nighttime driving, be fulfilled under the supervision of a fully licensed driver before indicating the requirements are fulfilled. Likewise, the process 900 credits time for the initial licensee phase by requiring 200 hours of driving by the initial licensee. The 200 hours may be credited from entirely unsupervised driving during the day, or credited from supervised nighttime driving. In still further implementations, time is credited only when the vehicle is performing in a manner that complies with local traffic laws (e.g., is not speeding, etc.).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A vehicle control and monitoring system, comprising:
   a vehicle device comprising a processing subsystem, a communication subsystem that communicates over a wireless network, and a memory subsystem that stores:
   a plurality of user profiles, each user profile specifying a profile parameters for the user profile, the profile parameters defining operational limits for an automotive vehicle;
   an administrator profile, the administrator profile storing contact information for wirelessly providing data to an administrator device; and processing instructions that are executable by the processing subsystem and upon such execution cause the processing subsystem to perform operations comprising:
- determine a profile of a user that is in an operator role of a vehicle in which the vehicle device is installed, the determination comprising receiving, from a smart key, a profile identifier of a user that is in an operator role of the vehicle, the profile identifier identifying the profile of user, and wherein each profile identifier is uniquely associated with a respective smart key so that each smart key identifies the respective profile of the user;
- if the profile of the user in one of the user profiles, then:
  - obtain vehicle parameters that describe the current operation of the vehicle;
  - determine whether the vehicle parameters are within the operational limits defined by the profile parameters of the user profile of the user that is in the operator role of the vehicle;
  - in response to determining that a vehicle parameter is not within the operational limits defined by the profile parameters, perform an out of profile parameter process that includes wirelessly sending a violation report to the administrator device by use of the communication subsystem;

wherein the processing instructions cause the processing subsystem to perform operations further comprise:
- for each determination of a user profile, performing a security test based on prior usage pattern data associated with the user profile that defines time periods of normal usage; and
- for each security test for which a current time is determined to be within the time period of normal usage, unlocking an ignition of the vehicle;
- for each security test for which a current time is determined to be without the time period of normal usage, requiring approval by an administer associated with the administrator profile to unlock the ignition of the vehicle.

2. The system of claim 1, wherein:
the contact information for wirelessly providing data to an administrator device comprises short messaging service (SMS) communication contact information; and
wirelessly sending a violation report to the administrator device by use of the communication subsystem comprises sending a SMS message to the administrator device, the SMS message including location data and the data describing the vehicle parameters that are not within the operational limits.

3. The system of claim 2, wherein the system further includes a global positioning system module, and wherein the location data are latitude and longitude coordinates obtained from the global positioning system module.

4. The system of claim 3, further comprising:
software stored in a computer readable storage device, the software being executable by the administrator device and upon such execution cause the administrator device to perform operations comprising:
in response to receiving the violation report by an SMS message:
retrieve the location data from the violation report;
render a map on a display device of the administrator device, the map including the location specified by the latitude and longitude coordinates;
render an icon identifying the location of the vehicle; and
render on the map a message that describes the vehicle parameters that are not within the operational limits.

5. The system of claim 2, wherein the violation report further comprises data describing additional vehicle parameters, including a profile identifier of the user that is in the operator role of the vehicle.

6. The system of claim 2, wherein the violation report further comprises voice call data that facilitates establishing a voice call with the user that is in the operator role of the vehicle by use of the administrator device.

7. The system of claim 6, wherein the voice call data comprises a first cellular telephone number for the vehicle control and monitoring system.

8. A method performed by a vehicle mounted data processing apparatus, comprising:
storing, in the vehicle mounted data processing apparatus, a plurality of user profiles and an administrator profile, each user profile specifying a profile parameters for the user profile, the profile parameters defining operational limits for an automotive vehicle, and the administrator profile storing contact information for wirelessly providing data to an administrator device; and
determining a profile of a user that is in an operator role of a vehicle in which the vehicle device is installed, the determining comprising receiving, from a smart key, a profile identifier of a user that is in an operator role of the vehicle, the profile identifier identifying the profile of user, and wherein each profile identifier is uniquely associated with a respective smart key so that each smart key identifies the respective profile of the user;
if the profile of the user in one of the user profiles, then:
  obtaining vehicle parameters that describe the current operation of the vehicle;
  determining whether the vehicle parameters are within the operational limits defined by the profile parameters of the user profile of the user that is in the operator role of the vehicle;
  in response to determining that a vehicle parameter is not within the operational limits defined by the profile parameters, performing an out of profile parameter process that includes wirelessly sending a violation report to the administrator device;
for each determination of a user profile, performing a security test based on prior usage pattern data associated with the user profile that defines time periods of normal usage;
for each security test for which a current time is determined to be within the time period of normal usage, unlocking an ignition of the vehicle; and
for each security test for which a current time is determined to be without the time period of normal usage, requiring approval by an administer associated with the administrator profile to unlock the ignition of the vehicle.

9. The method of claim 8, wherein:
the contact information for wirelessly providing data to an administrator device comprises short messaging service (SMS) communication contact information; and
wirelessly sending a violation report to the administrator device comprises sending a SMS message to the administrator device, the SMS message including location data and the data describing the vehicle parameters that are not within the operational limits.

10. The method of claim 9, wherein the location data are latitude and longitude coordinates obtained from a global positioning system module.

11. The method of claim 9, wherein the violation report further comprises data describing additional vehicle parameters, including a profile identifier of the user that is in the operator role of the vehicle.

12. The method of claim 9, wherein the violation report further comprises voice call data that facilitates establishing a voice call with the user that is in the operator role of the vehicle by use of the administrator device.

13. The method of claim 12, wherein the voice call data comprises a first cellular telephone number for the vehicle control and monitoring system.

14. A vehicle control and monitoring system, comprising:
a vehicle device comprising a processing subsystem, a communication subsystem that communicates over a wireless network, and a memory subsystem that stores:
a plurality of user profiles, each user profile specifying a profile parameters for the user profile, the profile parameters defining operational limits for an automotive vehicle;
an administrator profile, the administrator profile storing contact information for wirelessly providing data to an administrator device; and
processing instructions that are executable by the processing subsystem and upon such execution cause the processing subsystem to perform operations comprising:
determine a profile of a user that is in an operator role of a vehicle in which the vehicle device is installed;
if the profile of the user in one of the user profiles, then:
obtain vehicle parameters that describe the current operation of the vehicle;
determine whether the vehicle parameters are within the operational limits defined by the profile parameters of the user profile of the user that is in the operator role of the vehicle;
in response to determining that a vehicle parameter is not within the operational limits defined by the profile parameters, perform an out of profile parameter process that includes wirelessly sending a violation report to the administrator device by use of the communication subsystem;
wherein the processing instructions cause the processing subsystem to perform operations further comprise:
for each determination of a user profile, performing a security test based on prior usage pattern data associated with the user profile that defines time periods of normal usage;
for each security test for which a current time is determined to be within the time period of normal usage, unlocking an ignition of the vehicle; and
for each security test for which a current time is determined to be without the time period of normal usage, requiring approval by an administer associated with the administrator profile to unlock the ignition of the vehicle.

15. A method performed by a vehicle mounted data processing apparatus, comprising:
storing, in the vehicle mounted data processing apparatus, a plurality of user profiles and an administrator profile, each user profile specifying a profile parameters for the user profile, the profile parameters defining operational limits for an automotive vehicle, and the administrator profile storing contact information for wirelessly providing data to an administrator device; and
determining a profile of a user that is in an operator role of a vehicle in which the vehicle device is installed;
if the profile of the user in one of the user profiles, then:
obtaining vehicle parameters that describe the current operation of the vehicle;
determining whether the vehicle parameters are within the operational limits defined by the profile parameters of the user profile of the user that is in the operator role of the vehicle;
in response to determining that a vehicle parameter is not within the operational limits defined by the profile parameters, performing an out of profile parameter process that includes wirelessly sending a violation report to the administrator device;
for each determination of a user profile, performing a security test based on prior usage pattern data associated with the user profile that defines time periods of normal usage;
for each security test for which a current time is determined to be within the time period of normal usage, unlocking an ignition of the vehicle; and
for each security test for which a current time is determined to be without the time period of normal usage, requiring approval by an administer associated with the administrator profile to unlock the ignition of the vehicle.

* * * * *